Patented July 25, 1944

2,354,531

UNITED STATES PATENT OFFICE 2,354,531

PROCESS OF AND MATERIAL FOR CREAMING LATEX AND LIKE MATERIALS

Gerry Mack, Jackson Heights, N. Y., assignor to Advance Solvents and Chemical Corporation, a corporation of New York No Drawing. Application January 2, 1941, Serial No. 372,840

11 Claims. (Cl. 260—822)

My invention relates in general to materials for and the processes of treating latex and the like materials, and more particularly to the materials for and the processes of creaming such materials.

By creaming of latex and the like material is meant a process which causes rubber latex or similar materials to form two superposed layers one of which is a purified rubber rich cream while the other layer consists of a serum poor in rubber. After this stratification, the rubber rich cream is separated from the serum, and, if desired, the cream of the serum or both may be further recreamed.

The processes for the creaming of latex and analogous materials, which are known in the art, are not entirely satisfactory, as pointed out in various articles and prior art patents.

A number of natural substances have been used as creaming agents for latex and like materials, amongst these being such products as Irish moss, gelatin, ammonium alginate, pectins, mucilages, and gums such as gum tragacanth and the like. These natural creaming agents suffer from the disadvantage they are subject to a wide variation in their capability of creaming latex, and, for this reason, considerable difficulties are encountered in creaming latex with such natural agents. For example, an article entitled "The Concentration of Latex by Creaming," H. C. Baker, published in "Transactions of the Institution of the Rubber Industry," volume 13, No. 1, pages 70 to 82, June 1937, states that in an examination of 25 samples of gum tragacanth obtained from different sources, 4 of the samples gave a cream below 50%, 11 of the samples a cream between 50% and 60%, and only the remaining 10 produced a concentration of over 60% of dry rubber in the cream. This article, thus, brings out the fact that roughly one-third of the samples were definitely unsatisfactory since latex creams containing less than 55% of dry rubber were obtained. It is one of the objects of my invention to provide a method of and materials for creaming latex and the like materials which will avoid the disadvantages inherent in the use of natural products as creaming agents.

In addition to and in place of the aforementioned natural substances, certain synthetic products such as the water soluble cellulose ethers (alkylated celluloses) have been used as latex creaming agents. The disadvantage of the use of such cellulose ethers is that the ethers become less soluble in water as the temperature is increased, and therefore, are not effective as creaming agents at higher temperatures. It is another of the objects of my invention to provide materials for and a process of creaming latex and the like materials which is fully operable over a wide range of temperatures, including the higher temperatures.

The cellulose ethers mentioned have the further disadvantage that they are just as soluble in water after drying as they were before so that rubber products made from latices creamed with cellulose ethers tend to display a reduced resistance against water. It is a further object of my invention to devise a latex-creaming process which yields latices capable of being dried into products having a very high resistance to water.

Also some of the previously known methods of treating latex and the like materials to bring about creaming have suffered from the disadvantage that large quantities of the creaming agent had to be added to the latex or the like materials with the result that a certain amount of the creaming agent remained in the rubber rich cream. It is desirable that the amount of the creaming agent remaining in the rubber rich cream of the latex or the like material should be a minimum, and it is a still further object of my invention to provide a process of and materials for creaming latex and the like materials in which there will remain a minimum of the creaming agent in the rubber rich cream of the creamed material.

Still another object of my invention is to provide a latex creaming process and latex creaming agents which are equally suitable for the initial creaming of natural latices of relatively low concentration and for the recreaming of latex creams and serums obtained from previous creaming operations.

My copending application Ser. No. 345,763 (now U. S. Patent No. 2,326,956) describes a process for thickening latices and the like by admixing with a quantity of latex containing 100 parts by weight of solids at least 0.6 part by weight of an alkali soluble acid cellulose dicarboxylate or a corresponding quantity of a water soluble salt of such acid dicarboxylate.

According to the present invention, I accomplish the above mentioned objects by creaming the latex after adding thereto an even smaller proportion of a salt of a cellulose acetate dicarboxylate which is soluble in the latex, such as for instance cellulose acetate sodium phthalate and similar salts of acid cellulose acetate dicarboxylates. I have found that latex-cellulose acetate dicarboxylate salt blends containing per 100 parts by weight of rubber about 0.15 to 0.45 part by weight of the creaming agent will cream in a relatively short time upon standing.

Some of the salts which may be used as creaming agents according to the present invention are, for instance, the sodium salts, the zinc salts and the ammonium salts of the acid cellulose acetate dicarboxylates, but salts of acid cellulose acetate dicarboxylates with other organic and inorganic bases may be employed provided that they are soluble in latex.

The ammonium salts of the acid cellulose acetate dicarboxylates have been found to be particularly useful in my process because they decompose slowly upon aging or forced drying thereby converting the ammonium group of the salt into ammonia and rendering the remaining acid ester insoluble in water. Thus the moisture resistance of an article made of latex creamed with an agent of this type is not adversely affected by remnants of the creaming agent in the rubber composition.

The following examples may serve to illustrate without limiting the invention.

Example 1

A normal latex having a total solids content of 40% to 42% had added thereto various small amounts of a soluble salt of a cellulose acetate sodium phthalate. Stirring for a few minutes took place and the latex was allowed to cream. In a short time a distinct separation into two layers occurred, one of the layers being a rubber rich portion and the other being a rubber poor serum portion. The mixture was allowed to stand for approximately 96 hours at room temperature, and an analysis was made on each of the portions, one of the portions being the cream or rubber rich portion, and the other being the serum or rubber poor portion. The results are indicated in the following table:

| Parts of Cellulose acetate sodium phthalate per 100 parts latex solids | Percentage of solids in cream | Percentage of solids in serum |
| --- | --- | --- |
| 0.150 | 55.5 | 22.40 |
| 0.225 | 59.0 | 17.50 |
| 0.300 | 60.5 | 13.70 |
| 0.450 | 62.5 | 8.15 |

Example 2

The process described in Example 1 was repeated using cellulose acetate zinc phthalate as the creaming agent. The results were substantially similar to those set forth in Example 1.

Example 3

A normal 40% to 42% latex was mixed with 0.45 part by weight of cellulose acetate sodium phthalate to 100 parts by weight of the natural solids of the latex, and the mixture was creamed by allowing it to stand at a temperature of 69° centigrade for a period of substantially 26 hours. At the end of this time the cream or rubber rich portion had a solids content of 57.25% and the serum or rubber poor portion had a solids content of 10%. This fully illustrates the excellent water solubility of the cellulose acetate dicarboxylate salts at higher temperatures, and the resultant acceleration of the creaming process by the use of comparatively high temperatures. Another advantage is that the cellulose acetate dicarboxylate salts can be used at higher temperatures without coagulating the latex when the latter is heated to accelerate the creaming rate.

Example 4

0.45 part by weight of cellulose acetate ammonium phthalate were added to a quantity of a normal 40% to 42% latex containing 100 parts by weight of solids. The mixture was allowed to stand until two layers had been formed whereupon the rubber rich cream was separated from the serum. A film made by drying the cream was completely water resistant owing to the fact that the ammonia had been released upon drying and had left a residue containing an ester insoluble in water.

Example 5

The 57.25% rubber latex cream obtained from the creaming process according to Example 3 was recreamed by a further addition of cellulose acetate sodium phthalate. The mixture was again left to stand until two layers had formed and the cream was then separated from the serum.

Example 6

The process according to Example 3 was repeated using cellulose acetate sodium succinate as creaming agent instead of cellulose acetate sodium phthalate.

The stratification of latices and of latex creams by means of the process and materials hereinbefore recited, may be utilized also as a means of eliminating a portion of the non-rubber constituents from the concentrated latex. This can be accomplished by shaking up the creamed portion in a fresh volume of water and repeating the previous creaming process to accomplish a further removal of water soluble non-rubber constituents.

The term latex used herein is to be understood to include natural, crude or vulcanized latex, or materials analogous to latex, such as synthetic materials which bear a similarity to latex in properties. The latex may be preserved with the usual preservatives such as ammonia or fixed alkalis.

What I claim is:

1. A process for concentrating latex and the like materials, which process comprises treating a quantity of latex containing 100 parts by weight of solids with between about 0.15 and 0.45 part by weight of a creaming agent selected from the group consisting of the alkali soluble acid cellulose acetate dicarboxylates and their water soluble salts, allowing the latex to form a rubber rich cream layer and a rubber poor serum layer, and separating the cream from the serum.

2. A process, as claimed in claim 1, in which the ammonium salt of a cellulose acetate dicarboxylate is used as the creaming agent.

3. A process as claimed in claim 1, in which the zinc salt of a cellulose acetate dicarboxylate is added as the creaming agent.

4. A process, as claimed in claim 1, in which an alkali metal salt of a cellulose acetate dicarboxylate is used as the creaming agent.

5. A process, as claimed in claim 1, in which a water soluble salt of an acid cellulose acetate ester of a dibasic aromatic acid is used as the creaming agent.

6. A process, as claimed in claim 1, in which a water soluble salt of an acid cellulose acetate ester of a dibasic aliphatic acid is used as the creaming agent.

7. A process, as claimed in claim 1, in which a water soluble salt of a cellulose acetate phthalate is used as the creaming agent.

8. A process, as claimed in claim 1, in which a water soluble salt of a cellulose acetate succinate is used as the creaming agent.

9. A process, as claimed in claim 1, in which a cellulose acetate ammonium phthalate is used as the creaming agent.

10. A process, as claimed in claim 1, in which a cellulose acetate zinc phthalate is used as the creaming agent.

11. A process, as claimed in claim 1, in which a cellulose acetate sodium succinate is used as the creaming agent.

GERRY MACK.